(12) United States Patent
Stefko et al.

(10) Patent No.: US 8,599,988 B2
(45) Date of Patent: Dec. 3, 2013

(54) CONTROL ROD TRANSFER DEVICE

(75) Inventors: David J. Stefko, Jeannette, PA (US);
Jason A. Hartle, Gibsonia, PA (US);
Craig Deah, Allison Park, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 502 days.

(21) Appl. No.: 13/069,615

(22) Filed: Mar. 23, 2011

(65) Prior Publication Data
US 2011/0235769 A1    Sep. 29, 2011

Related U.S. Application Data

(60) Provisional application No. 61/316,956, filed on Mar. 24, 2010.

(51) Int. Cl.
*G21C 7/12* (2006.01)

(52) U.S. Cl.
USPC ............................ 376/260; 414/146; 294/906

(58) Field of Classification Search
USPC ............ 376/219, 227, 260; 414/146; 294/906
See application file for complete search history.

(56) References Cited

U.S. PATENT DOCUMENTS

| | | | |
|---|---|---|---|
| 3,604,746 A * | 9/1971 | Notari .......................... | 376/232 |
| 3,941,413 A * | 3/1976 | Johnson et al. ............... | 376/233 |
| 3,994,775 A | 11/1976 | Spurrier | |
| 4,202,727 A * | 5/1980 | Batjukov et al. .............. | 376/264 |
| 4,204,910 A * | 5/1980 | Koshkin et al. ............... | 376/264 |
| 4,236,967 A * | 12/1980 | Batjukov et al. .............. | 376/271 |
| 4,244,616 A * | 1/1981 | Buchalet ........................ | 294/95 |
| 4,259,153 A * | 3/1981 | Pryamilov et al. ............ | 376/262 |
| 4,374,801 A | 2/1983 | Albin | |
| 4,585,612 A | 4/1986 | Coussau et al. | |
| 4,713,210 A * | 12/1987 | Germer ......................... | 376/233 |
| 4,741,878 A | 5/1988 | Gebelin et al. | |
| 4,885,123 A * | 12/1989 | Ikeuchi et al. ................ | 376/233 |
| 5,011,206 A * | 4/1991 | Guironnet .................. | 294/86.41 |
| 5,053,189 A | 10/1991 | Chrise et al. | |
| 5,066,451 A | 11/1991 | Tessaro | |
| 5,183,626 A | 2/1993 | Denizou | |
| 5,227,125 A | 7/1993 | Beneck et al. | |
| 5,325,408 A | 6/1994 | Hornak et al. | |
| 5,377,239 A | 12/1994 | Nopwaskey et al. | |
| 6,282,254 B1 | 8/2001 | Burton et al. | |
| 6,327,322 B1 | 12/2001 | Burton et al. | |
| 6,865,242 B2 | 3/2005 | Barbe et al. | |
| 7,505,545 B2 | 3/2009 | Kim et al. | |

* cited by examiner

*Primary Examiner* — Michael Carone
*Assistant Examiner* — Reginald Tillman, Jr.
(74) *Attorney, Agent, or Firm* — Richard J. Coldren; Westinghouse Electric Company LLC

(57) ABSTRACT

A telescoping rod control cluster assembly change tool for moving control rod assemblies among fuel assemblies in a nuclear facility. The operation of the tool is completely mechanical and the telescoping feature enables the tool to have a relatively low profile when it is being moved and stored without housing a control rod assembly. Rigidly supported alignment cards guide a gripper that attaches to the control rod assembly as the control rod assembly is withdrawn into the tool with the alignment cards preventing any lateral or rotational movement of the gripper.

16 Claims, 9 Drawing Sheets

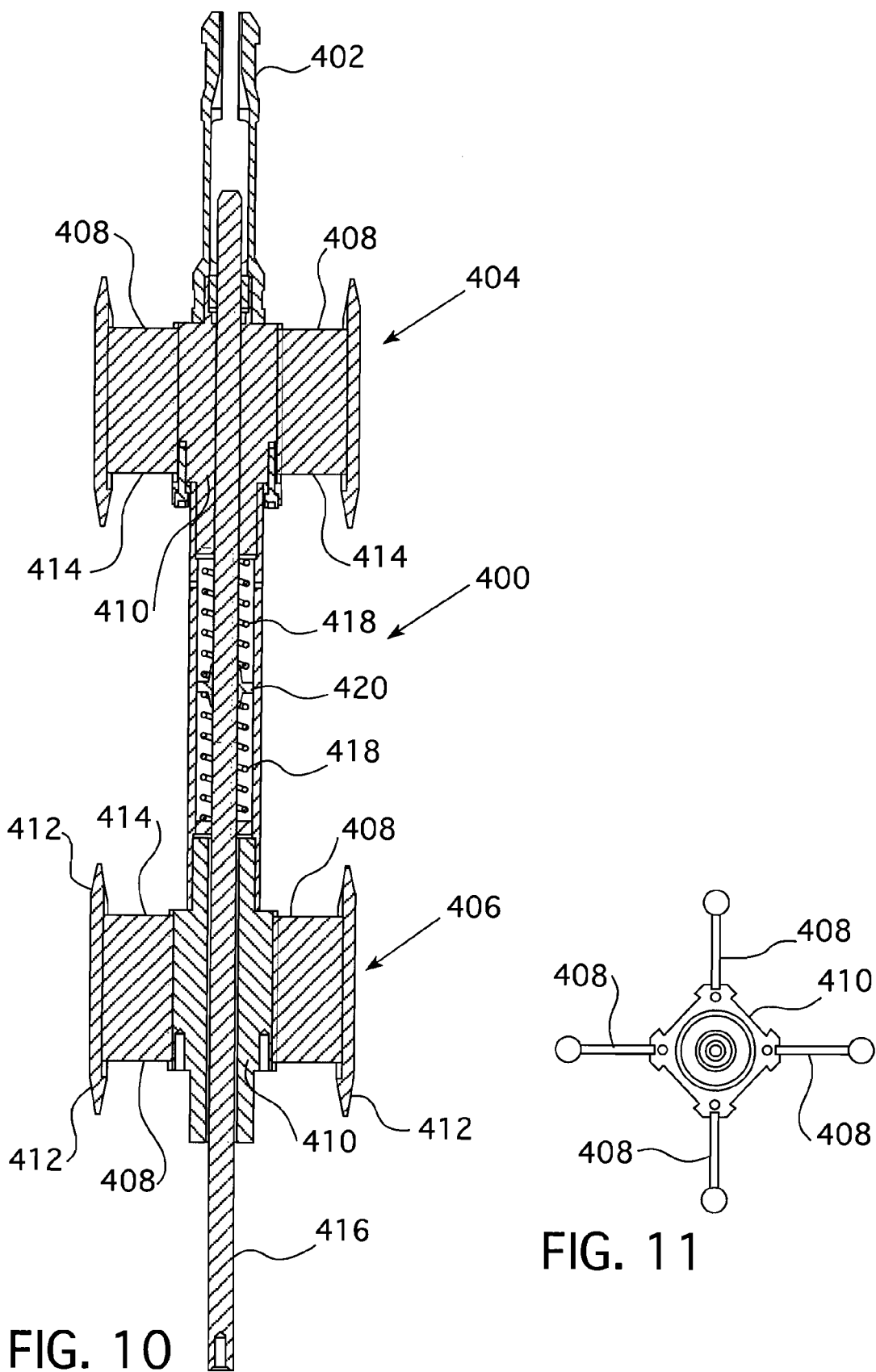

CONTROL ROD TRANSFER DEVICE

CROSS REFERENCE TO RELATED APPLICATIONS

This application claims priority to Provisional Application Ser. No. 61/316,956, filed Mar. 24, 2010.

BACKGROUND

1. Field

This invention relates to a device for transporting control rod assemblies between fuel assemblies in a facility associated with a nuclear power generation plant and, more specifically, to a device for transferring control rod assemblies among fuel assemblies that uses an overhead crane as its primary lifting mechanism.

2. Related Art

Fuel for a nuclear reactor used to create steam and, ultimately, electricity, generally is in the form of fuel rods containing a fissile material. When fuel rods are being stored, the fuel rods are typically supported in nuclear fuel assemblies arranged as spaced parallel arrays. Fuel assemblies are stored in racks in a protective medium, such as water containing boric acid. In addition to the fuel rods, poison rods and/or water displacer rods are dispersed throughout the fuel assemblies to control the fission process. Poison rods generally include a plurality of elongated rods, each containing a neutron absorbent material, which fit in longitudinal openings, or thimbles, defined in the fuel assemblies. The top end of each poison rod is attached to a web or spider, thereby forming a poison rod assembly. A T-shaped bar or threaded hub is affixed to the top of the web or spider creating an easily accessible attachment point for lifting a poison rod assembly so it may be transferred from one fuel assembly to another.

Because the poison rods, which are approximately 12 to 14 feet (3.66 to 4.27 meters) long, are only connected by the web or spider located at the top of the poison rod assembly, the lower end of the poison rods move freely, and, as such, can be difficult to reinsert within a second fuel assembly without the aid of a means for alignment. Prior art transfer devices provided comb assemblies as an alignment means. A comb assembly consists of at least two plates having slots corresponding to the rows of poison rods in the poison rod assembly. The plates are oriented at 90° to each other. As such, when the plates are positioned on top of each other, a grid is formed with an opening for a poison rod at each intersection of the slots. To provide extra stability, comb assemblies typically have two spaced grids. Each comb grid is typically formed of four plates, two plates with channels extending in one direction and two plates with channels extending in perpendicular direction. The plates are divided so that the comb assemblies may be moved aside while the web portion of the poison rod assembly is being lifted from the fuel assembly. Once the web portion of the poison rod assembly is above the comb assemblies, the comb assemblies are brought into place providing support and guidance for the poison rods.

As shown in Hornack et al., U.S. Pat. No. 5,325,408, some prior art transfer devices use a winch located at the top of the transfer device to lift the poison rod assembly. Movement of the transfer device itself between fuel cells, is accomplished by a gantry crane in the fuel cell storage facility. Thus, this type of prior art lifting device consists of at least two lifting means, one to lift the transfer device itself, and one to lift the poison rod assembly within the transfer device. Burton et al., U.S. Pat. No. 6,327,322, recognize the advantage of the transfer device functioning with a single lifting mechanism. However, movement of the transfer device was still awkward because of the extended length of the transfer mechanism which was suspended from the gantry crane.

Accordingly, a further improvement in the transfer mechanism is desired that will improve its reliability and ease of operation.

SUMMARY OF THE INVENTION

The foregoing object is achieved by a transfer device for moving a control rod assembly between fuel assemblies using an overhead crane. The control rod assembly has a plurality of spaced control rods which are supported from an overhead web or spider frame which aligns the control rod with guide thimble tubes in the fuel assemblies in which the control rods are designed to be inserted. In accordance with this embodiment, the transfer device includes an upper latch tube assembly having a longitudinal axis. An elongated inner member is slidably supported within the upper latch tube assembly is operable to telescope substantially coaxially with the longitudinal axis. A gripper assembly is supported from the elongated inner member and has an actuation arm reciprocably slidably supported within the elongated inner member to move substantially along the longitudinal axis a selected distance to actuate a gripper at one end of the gripper assembly. Another end of the gripper assembly is connected to an end of the elongated inner member which at another end includes a bail which is adapted to be attached to an overhead crane. An interlock assembly is attached to the upper latch tube assembly and selectively couples the elongated inner member to the upper latch tube assembly at one or another of two elevations along the longitudinal axis, with the one elevation being in a substantially extended position and the another elevation being in a substantially retracted position. An elongated enclosure assembly extends along the longitudinal axis and has a length at least substantially equal to the height of the control rod assembly. The length of the elongated closure assembly is substantially rigidly connected to one end of the upper latch tube assembly and has another end configured to key on the top of the fuel assembly or a can in which the fuel assembly is inserted. A plurality of alignment cards are laterally disposed in a spaced, tandem array along the length of the enclosure assembly with each of the alignment cards having openings that are aligned and sized to pass a control rod of the control rod assembly, so that the control rods are withdrawn into the enclosure assembly in alignment with the guide thimble tubes of the fuel assembly. The alignment cards further include a central opening through which the gripper assembly can pass through and at least some of the alignment cards central opening is sized to pass at least a portion of the elongated inner member.

Preferably, the alignment cards prevent rotation of the gripper assembly whether or not the gripper assembly is attached to a control rod assembly. Desirably, the gripper assembly includes a central body having a generally rectangular cross section profile that fits in a corresponding central opening in at least some of the alignment cards. In one embodiment, the gripper assembly includes at least one laterally extending fin that fits in a corresponding slot in at least some of the alignment cards. Preferably, the gripper assembly includes a plurality of laterally extending fins that are spaced around a circumference of the gripper assembly and are desirably, equally spaced around the circumference of the gripper assembly. In another embodiment, a distal lateral end of the fin is contoured to have an enlarged cross section that fits in a corresponding opening in at least some of the alignment cards. Preferably, the contour is round and the distal lateral end of the fin has a bullet nose in at least one end in a direction of travel of the gripper assembly. Desirably, the distal lateral end of the fin has a bullet nose in an end on either side of the direction of travel of the gripper assembly.

In another embodiment, the gripper assembly is biased in a latched condition.

BRIEF DESCRIPTION OF THE DRAWINGS

A further understanding of the invention can be gained from the following description of the preferred embodiments when read in conjunction with the accompanying drawings in which:

FIG. 10 is a cross sectional view of the gripper assembly of the rod cluster control change tube shown in FIG. 3; and FIG. 11 is a plan view of the gripper assembly shown in FIG. 10.

DESCRIPTION OF THE PREFERRED EMBODIMENT

Figure 1:
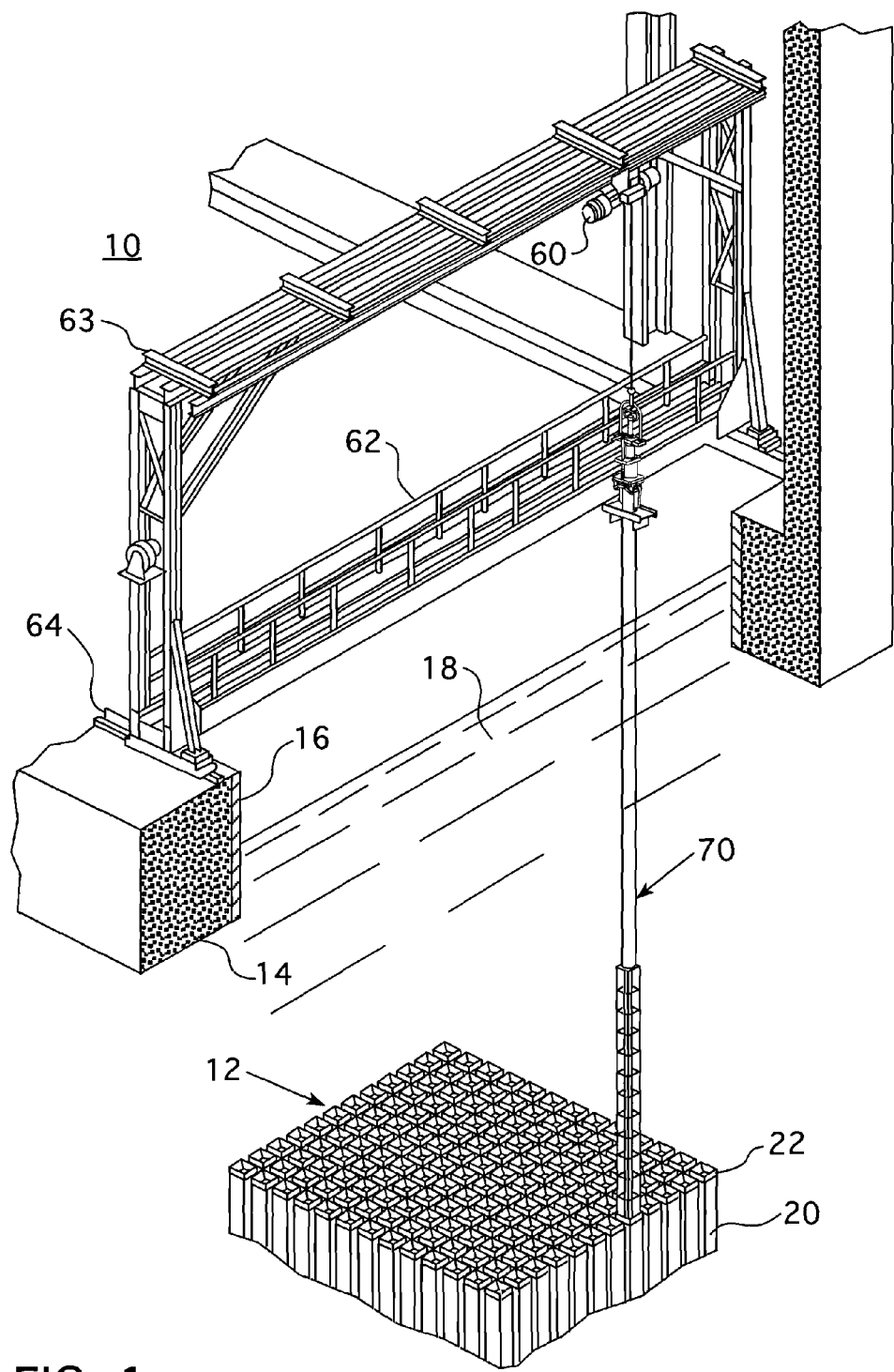
FIG. 1 is a perspective view of a spent nuclear fuel storage pool.
Figure 2:
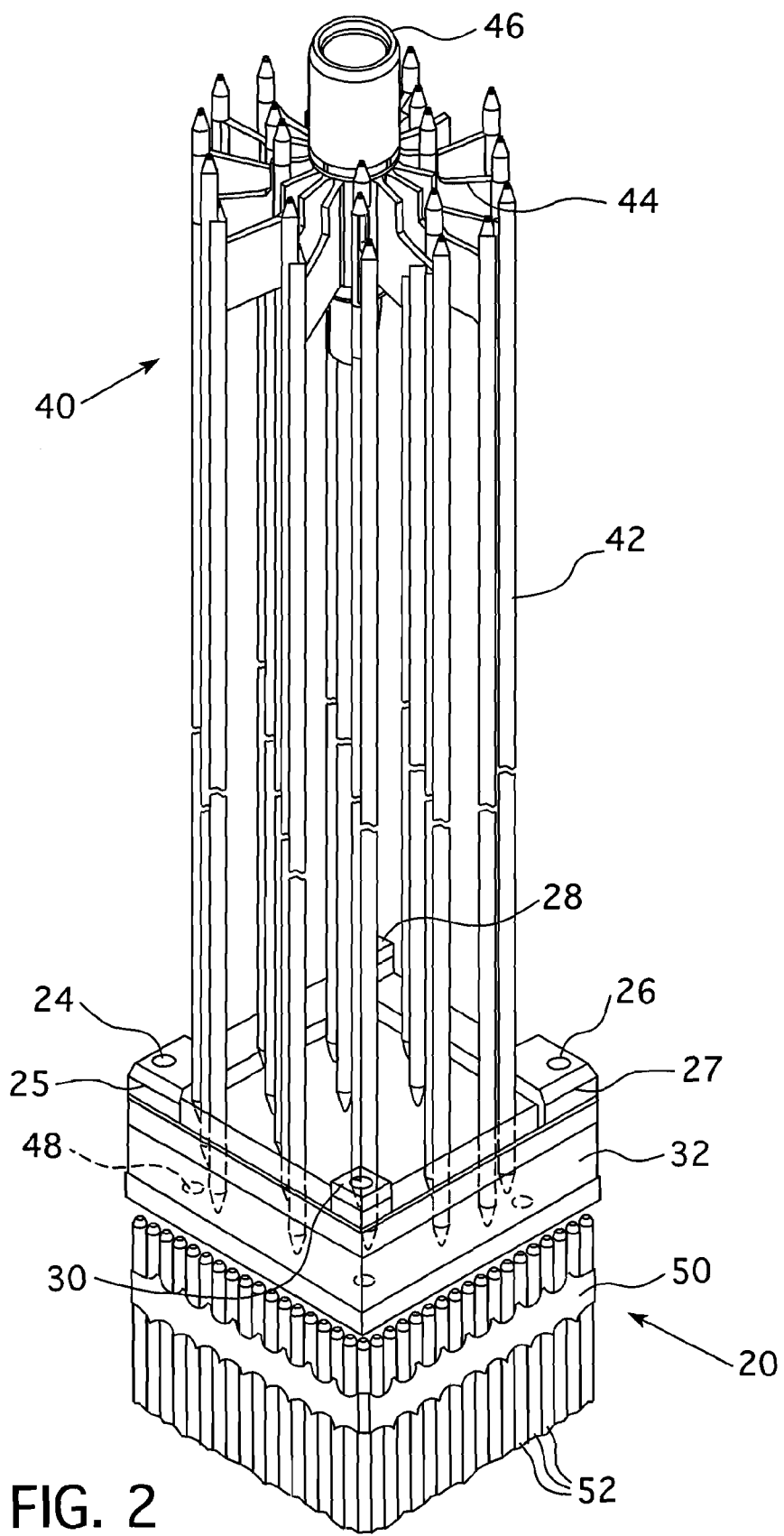
FIG. 2 is a perspective view of a poison rod assembly partially withdrawn from a fuel cell.

Referring to FIG. 1, there is illustrated a spent fuel storage pool 10 which contains a plurality of spent nuclear fuel racks 12. The spent fuel pool 10 is a sealed enclosure comprised of concrete 14 and a sealed metallic liner 16. The spent fuel pool 10 is filled with a shielding medium, such as water containing boric acid 18. Each fuel rack 12 includes a plurality of vertically oriented spaced apart fuel cells 20. Each cell 20 is sized to received a fuel assembly 50 (described below). Each cell 20 has a metallic can 22 affixed to the top of the cell 20. The can 22 may include a square funnel to guide a fuel assembly 50 into its storage position. As shown in FIG. 2, the can 22 includes two bores 24, 26 in raised plates 25, 27 at diagonally opposite corners. The remaining corners of the can 22 define standoff plates 28, 30. However, it should be appreciated that the fuel assembly top nozzle may have the bores 24, 26, raised plates 25, 27 and standoff plates 28, 30, without departing from the intent of this embodiment.

Referring to FIG. 2, a poison rod assembly 40 is shown partially extracted from a fuel cell 20. Each fuel assembly 50 is formed in part from fuel rods 52 which are intermixed with poison rods 42. The fuel rods 52 are generally positioned on the periphery of the fuel assembly 50 and the poison rods 42 are generally positioned in an inner portion of the fuel assembly 50. The poison rods 42 are joined at their top portions by a support web 44 which may take the form of the spider 44 illustrated in FIG. 2 or other rudimentary web form such as that described in U.S. Pat. No. 6,327,322. A hub 46 is centrally attached to the support web 44 extending upwardly, forming an easily accessible attachment point for lifting the poison rod assembly 40. When the poison rod assembly 40 is positioned within the fuel assembly 50, each poison rod 42 is disposed within a thimble 48 mounted in the fuel assembly 50 between a top nozzle 32 and a bottom nozzle which is not shown.

Referring to FIG. 1, a poison rod assembly transfer device 70 of the present invention is illustrated within a spent fuel pool 10. The transfer device 70 is suspended within the spent fuel pool 10 by an overhead crane 60. The overhead crane 60 is coupled to a moveable walkway 62 and gantry 63. The moveable walkway 62 and the gantry 63 are mounted on walkway rails 64 located above the water line 18 of the spent fuel pool 10. The crane 60, moveable walkway 62 and gantry 63 are used to lift the transfer device 70 and a poison rod assembly 40 and move them between fuel cells 20. The transfer device 70 is seated on a fuel cell 20 and attached to a poison rod assembly 40 as detailed below. Though, the transfer device discussed hereafter is described with regard to the movement of a poison rod assembly, it should be appreciated that the transfer device can also be employed to move any control rod assembly, such as an annular burnable absorber assembly, water displacement rod assembly, or neutron source assembly with only a modification to the gripper attachment point to provide a compatible coupling of the transfer device to the assembly to be moved. Similarly, the transfer device may be used in the main containment of such a facility to move control assemblies within the core of a nuclear reactor, though that might not be the most efficient use of the apparatus.

Figure 3:
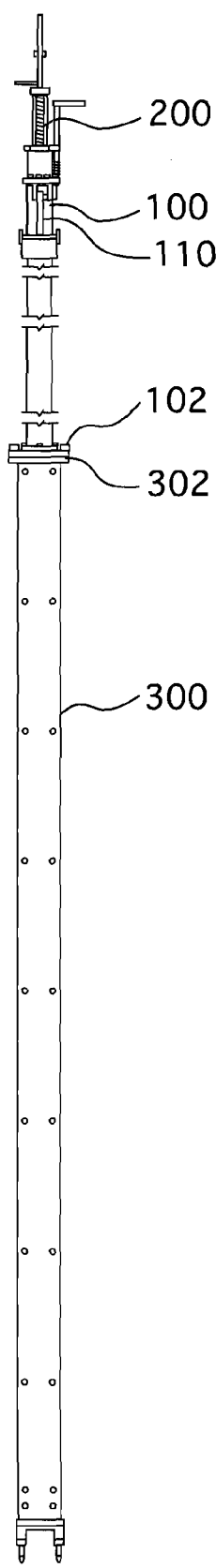
FIG. 3 is an elevational view of rod cluster control assembly change tool of this invention.
Figure 3A:
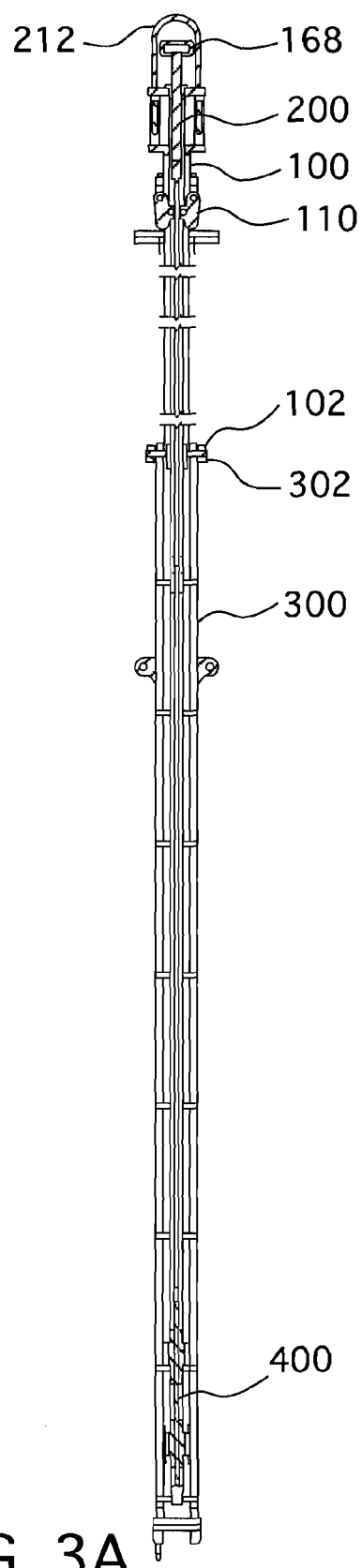
FIG. 3A is a cross sectional view of a rod cluster control change tool shown in FIG. 3.
Figure 3B:
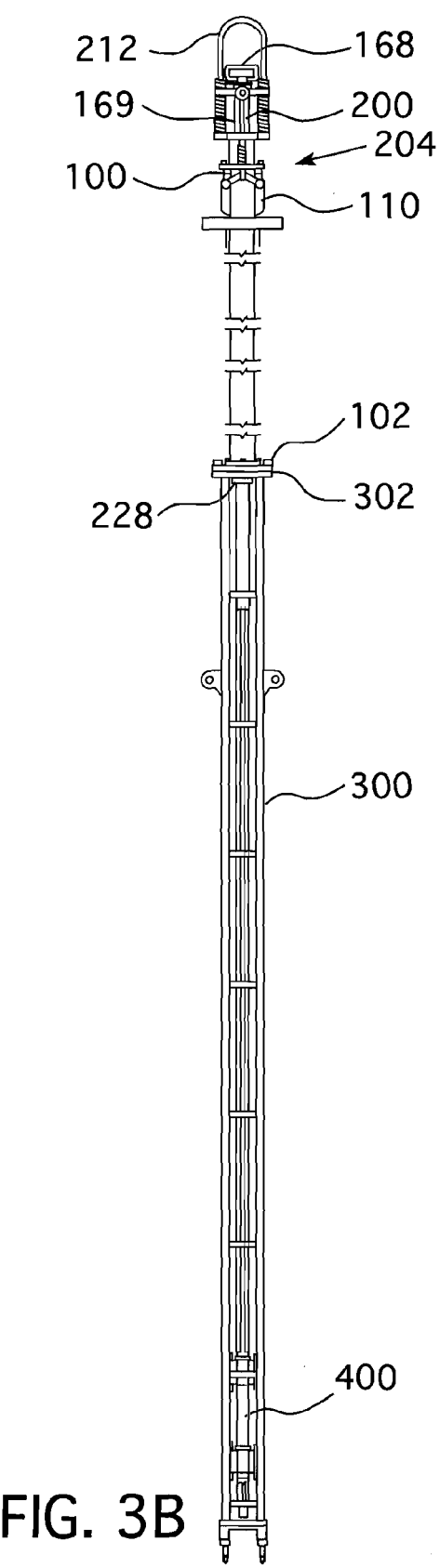
FIG. 3B is an elevational view, partially in section, of the rod cluster control change tool shown in FIGS. 3 and 3A with the latches of the upper latch tube assembly engaged in the upper slots of the inner support tube.
Figure 3C:
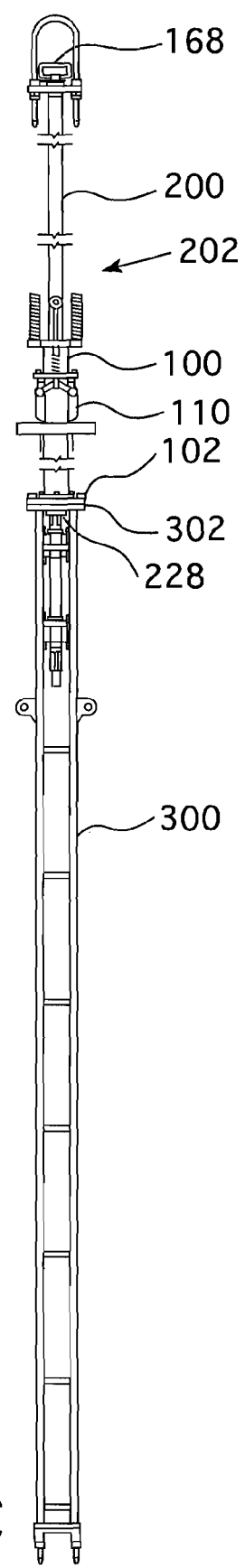
FIG. 3C is an elevational view, partially in section, of the rod cluster control change tool shown in FIGS. 3 and 3A with the latches of the upper latch tube assembly engaged in the lower slots in the inner support tube assembly.

The transfer device 70 is shown in more detail generally in FIGS. 3, 3A, 3B and 3C, with different sections shown in more detail in the remaining figures. The transfer device 70 includes four basic sections; an upper latch tube section 100, an inner support tube assembly 200, an enclosure assembly 300 and a gripper assembly 400 which can generally be appreciate from FIGS. 3, 3A, 3B and 3C. The outer member is comprised of the upper latch tube assembly 100 and an enclosure assembly 300 which are rigidly connected at the flanges 102, 302, respectively. The enclosure assembly 300 supports and protects the poison rod assembly 40 as it is extracted from the fuel cell 20. In the preferred embodiment, the upper latch tube assembly 100 is tubular. The enclosure assembly 300 is fixed below the upper latch tube assembly 100. The enclosure assembly 300 is an appropriate length to support substantially the full length of the poison rod assembly when it is drawn within the enclosure assembly. Inner support tube assembly 200 is slidably disposed within the upper latch tube assembly 100 and the enclosure assembly 300, and is coupled at its lower end to the gripper assembly 400. The gripper assembly 400 includes a gripper 402 at its distal end that rides within the enclosure assembly 300, traveling substantially over the longitudinal length thereof. The inner support tube assembly 200 and upper latch tube assembly 100 can be selectively coupled by an interlock device 110. The interlock device 110 locks the inner support tube assembly 200 in either an upper position 202 as shown in FIG. 3C or a lower position 204 as shown in FIG. 3B. The inner support tube assembly 200 is attached to the crane 60 as shown in FIG. 1 so that, when the inner support tube assembly 200 is not coupled to the upper latch tube assembly 100 and through the upper latch tube assembly 100 to the enclosure assembly 300 and the crane 60 is raised, enclosure assembly 300 and upper latch tube assembly 100 remain stationary and the inner support tube assembly 200 and gripper assembly 400 move vertically. When the interlock device 110 is engaged, however, inner support tube assembly 200 is coupled to the upper latch tube assembly 100 and the enclosure assembly 300 and raising the crane 60 raises the entire transfer device. It should be noted that the actuator 168 that operates the gripper 402 on the gripper assembly 400, through the shaft 416 (as will be explained hereafter), has a cylinder 169 that blocks the lower latch openings 220, 222 (FIG. 9) in the inner support tube assembly 200 when the inner support tube is fully inserted in the enclosure assembly 300 and the gripper 402 is activated. In this position, (shown in FIG. 3B), the cylinder prevents the interlock 110 from latching the inner support tube 200 to the upper latch tube assembly 100. In that way, the poison rod assembly cannot be raised until it is fully supported in the enclosure assembly 300.

Thus, lifting of a poison rod assembly 40 is accomplished by an operator using the crane 60 to position the transfer device 70 over a fuel cell 20 containing a poison rod assembly 40. Once the transfer device 70 is seated on the fuel cell 20, the operator uses crane 60 to lower the inner support tube assembly 200 and the gripper assembly 400 until the gripper 402 engages the hub 46 of the poison rod assembly 40. When the gripper 402 has engaged the hub 46, the operator releases the interlock 110 and uses crane 60 to lift the inner support tube assembly 200, the gripper assembly 400 and the poison rod assembly 40. Once the poison rod assembly 40 is withdrawn from the fuel cell 20, the operator may use the moveable gantry 63 to reposition the crane 60 and transfer device 70 above another fuel cell 20. The transfer device 70 is seated on the second fuel cell 20 and the poison rod assembly 40 can be inserted into the second fuel cell 20. When the poison rod assembly 40 is seated within the second fuel cell 20, the gripper assembly 400 is disengaged from the poison rod assembly 40 and the transfer device 70 is removed.

Figure 6:
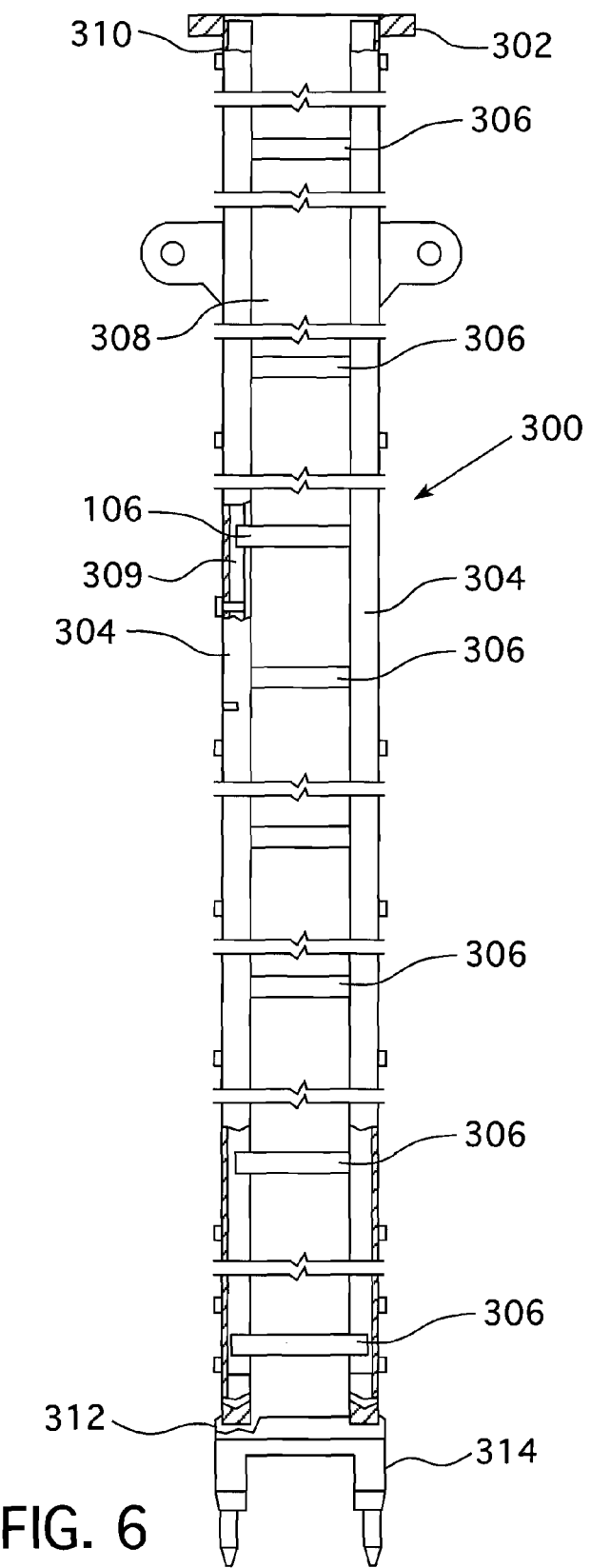
FIG. 6 is an elevational view of the enclosure assembly of the rod cluster control change tube of FIG. 3.
Figure 7:
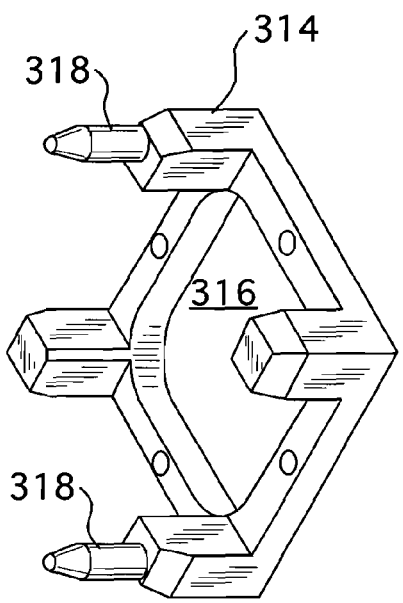
FIG. 7 is an isometric view of the lower platform of the enclosure assembly shown in FIG. 6.
Figure 8:
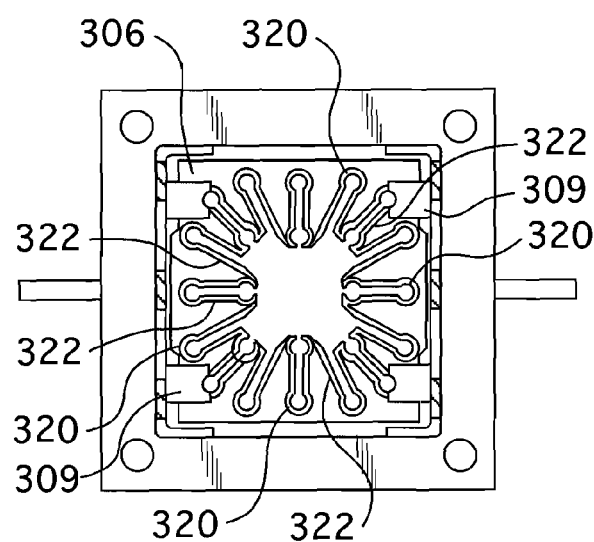
FIG. 8 is a plan view of an alignment card of the enclosure assembly shown in FIG. 6.

As shown in FIGS. 6, 7 and 8, the enclosure assembly 300 includes two C-members 304 held in spaced relationship by a number of horizontal guide plates (also referred to as alignment cards) 306 which are supported in a spaced tandem array along the length of the C-members 304. It should be appreciated that the C-members could be replaced by four angle channels at the corners or a tubular housing. The C-members 304 define a preferably square, frame cavity 308 that has slotted guide bars 309 proximate the corners as shown in FIGS. 6 and 8. Each C-member 304 has an upper end 310, located at the enclosure assembly upper end and a lower end 312 located at the enclosure assembly lower end. At the lower end 312 of the C-members 304 is a mounting pedestal 314. The C-members 304 are attached to the mounting pedestal 314 and the mounting pedestal 314 has a central opening 316 that communicates with the central cavity 308 of the enclosure assembly 300. The mounting pedestal can be better observed from the isometric view shown in FIG. 7. The central opening 316 in the pedestal 314 is sized to allow the poison rod assembly 40 to pass therethrough. The pedestal 314 communicates with the alignment cards 306 as the poison rod assembly is withdrawn. In operation, the poison rod assembly will be lifted through the pedestal 314 and alignment cards 306 by the gripper assembly 400 into a position within the frame of the enclosure assembly cavity 308. The pedestal 314 lower surface has at least one projection 318 with the preferred embodiment having at least two projections 318 extending downwardly from diagonally opposite corners as shown in FIG. 7. The projections 318 are sized to engage the bore holes 24, 26 on the fuel rod assembly top nozzle or assembly can 22. Thus, seating the transfer device 70 on the fuel cell 20 is accomplished by the operator lowering the device 70 until the projections 318 are seated within the bore holes 24, 26. Once the projections 318 are so seated, the transfer device 70 is resting on the fuel cell can 20.

The configuration of the alignment cards 306 is shown in FIG. 8 and includes a number of round openings 320 through which the poison rods pass and slots 322 through which webs on the gripper assemblies 400 slide as will be described hereafter. The alignment cards 306 also include a central opening 324 which is configured to correspond to the central body shape of the gripper assembly 400. Slotted guide bars 309 extend the full length of the C-members 304 and guide the gripper assembly 400 in between alignment cards 306.

As previously mentioned, the upper latch tube assembly 100 is fixed at its lower end 102 to an upper flange 302 of the enclosure assembly 300. Thus, when the transfer device 70 is seated on a fuel cell 20, enclosure assembly 300 and, therefore, upper latch tube assembly 100 are fixed in place. As noted above, inner support tube assembly 200 is slidably disposed within the upper latch tube assembly 100 and enclosure assembly 300. Thus, as shown in FIGS. 3, 3B and 3C, when the enclosure assembly 300 and upper latch tube assembly 100 are fixed in place, the inner support tube assembly 200 can slide between the upper position 202 and the lower position 204 within the enclosure assembly 300 and the upper latch tube assembly 100.

Figure 9:
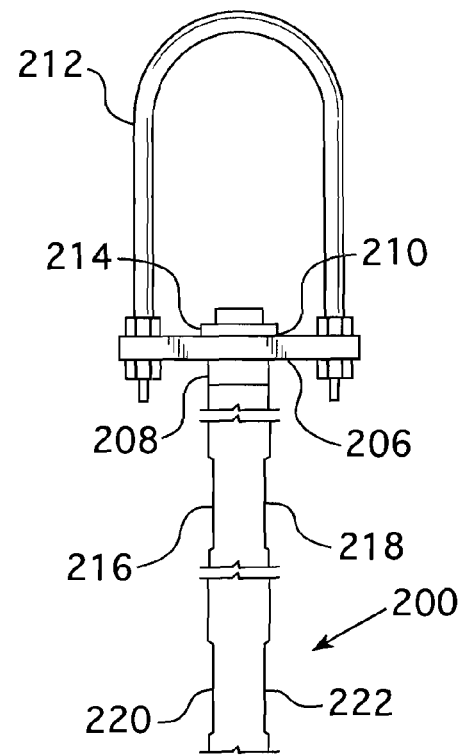
FIG. 9 is an isometric view of the inner support tube assembly of the rod cluster control change tube of this invention shown in FIG. 3.

As shown in FIG. 9, a platform 206 is mounted at the upper end 208 of the inner support tube assembly 200. The lifting platform 206 includes a medial opening 210 therethrough and a lifting bail 212 disposed above the platform 206. The inner support tube assembly 200 passes through the medial hole 210 and has a flange 214 that contacts the upper surface of the platform 206. The crane 60 is attached by conventional means to the bail 212. Thus, raising or lowering the inner support tube assembly 200 or transfer device 70 is accomplished through the crane 60 acting upon platform 206. Centering rails 226 center the inner support tube in the bushing 228 (FIGS. 3B and 3C) as the inner support tube assembly 200 moves within the enclosure assembly 300.

As shown in FIGS. 3C, 4, 5 and 9, the interlock device 210 allows the upper latch tube assembly 100 and, thus, the enclosure assembly 300 to be locked in either the upper position 202 or the lower position 204 with respect to the inner support tube assembly 200. In the upper position 202, the inner support tube assembly 200 is raised so that the gripper assembly 400 is adjacent to the top of the frame of the enclosure assembly 300. In the lower position 204, the gripper assembly 400 is adjacent to the lower end of the enclosure assembly 300, but, in the preferred embodiment, spaced above the mounting pedestal 314. However, it should be appreciated, that, in the lower position the gripper 402 of the gripper assembly 400 could be at or just below the mounting pedestal 314. When the inner support tube assembly 200 is in either locked position, 202 or 204, raising or lowering the crane 60 will lift or lower the transfer device 70. When the interlock device 110 is in an unlocked position, raising or lowering the crane 60 will slide the inner support tube assembly 200 and the gripper assembly 400 between the upper position 202 and the lower position 204 as shown in FIGS. 3B and 3C or allow the gripper assembly 400 to be lowered below the mounting pedestal 214 to engage a poison rod assembly 40.

The interlock device 110 is located adjacent to the upper end of the upper latch tube assembly 100. The interlock device 110 includes a pair of latch members 112 and 114, and a release mechanism 116, which includes support collar assembly 118 linking members 120, 122, a double clevis 124, push rod 126, spring 128, and interlock support plate 130. Additionally, the upper latch tube assembly 100 has two openings 132 and 134, spaced 180° apart, located adjacent to the interlock device 110. Finally, inner support tube assembly 200 has an upper pair of openings 216, 218 and a lower pair of openings 220, 222, each spaced 180° apart as shown in FIG. 9. The upper openings 216 and 218, are located proximal to the upper end of the inner support tube assembly 200 and the lower openings 220 and 222 are spaced approximately 13-15 feet (4-4.6 meters), just over the length of the poison rod assembly, below the upper openings 216, 218. As will be detailed below, spring 128, cooperating with linking members 120, 122 and push rod 126 urge the latch members 112, 114 to pass through the outer openings 132, 134 and either the upper or lower inner support tube assembly openings 116, 118, 120, 122 whereupon the inner support tube assembly 200 will be locked in place relative to the upper latch tube assembly 100.

Figure 4:
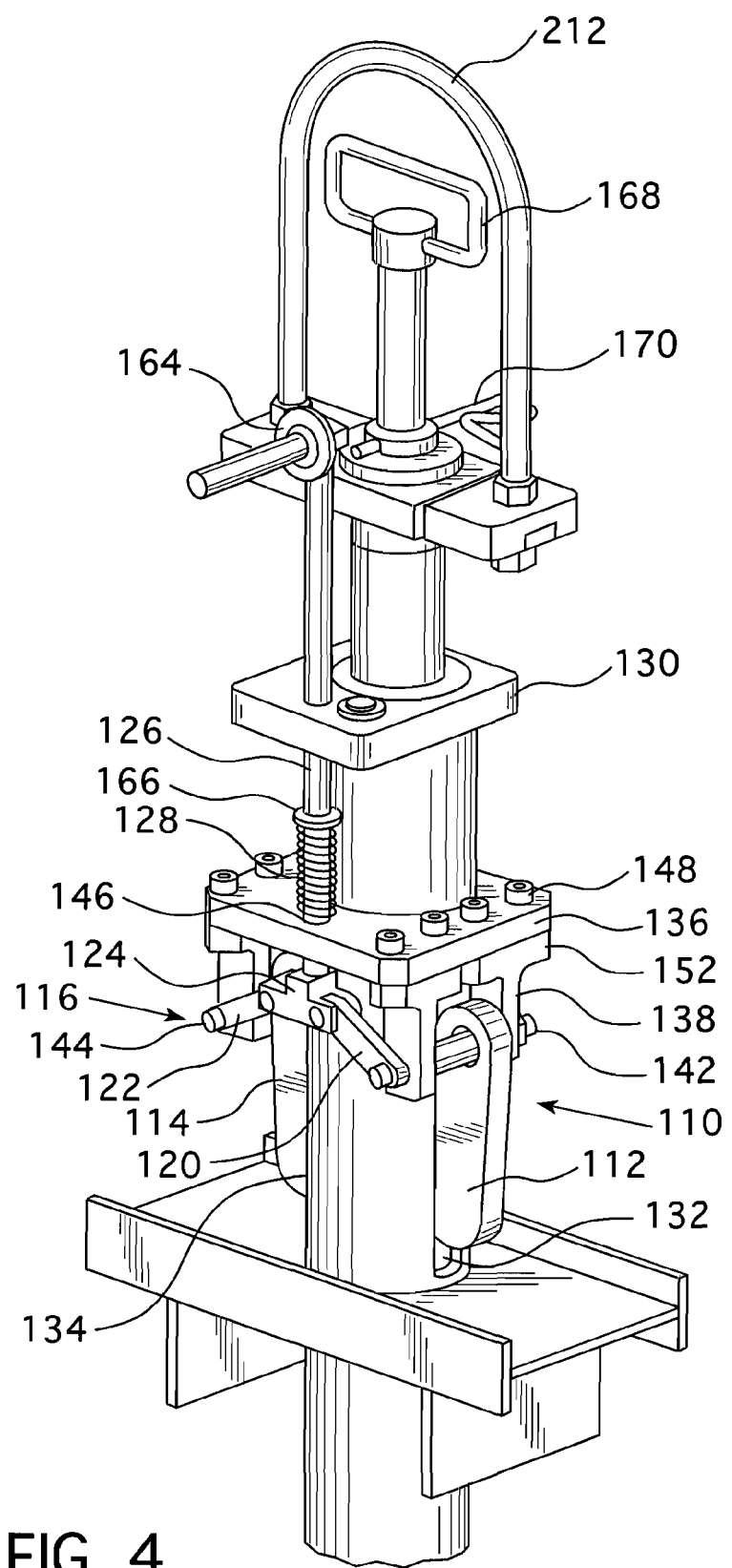
FIG. 4 is a perspective view of the upper latch tube assembly of the rod cluster control change tool shown in FIG. 3.
Figure 5:
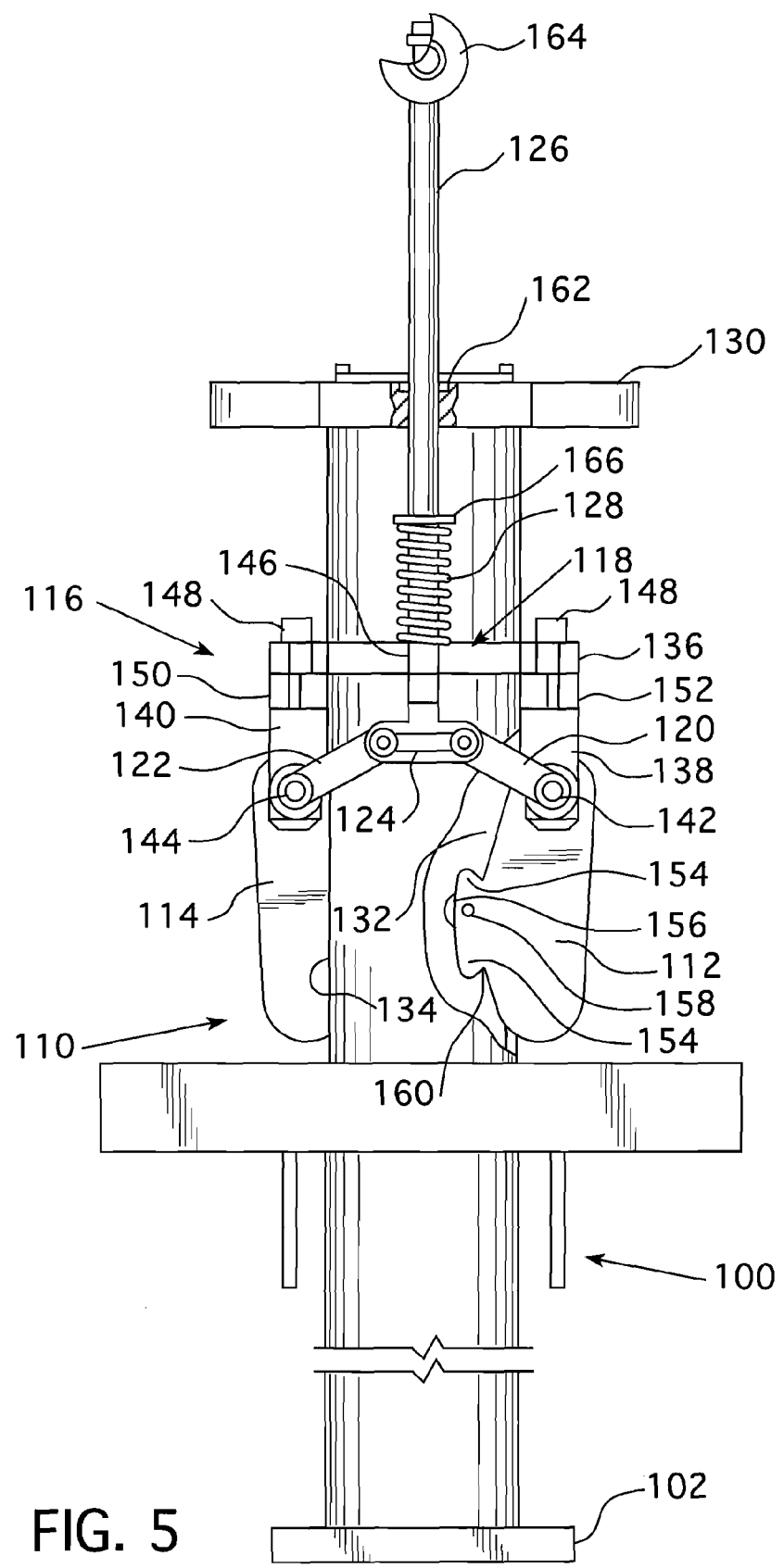
FIG. 5 is an elevational view partially in section of the upper latch tube assembly shown in FIG. 4.

Support collar 118 includes a collar 136, pin supports 138, 140, and pins 142, 144. As shown in FIGS. 4 and 5, the support collar 136 is rectangular with an offset medial opening 146 therethrough, and a plurality of fasteners 148. As shown in FIG. 5, the pin supports 138, 140 are disposed below the collar 136 held by fasteners 148 which are disposed within fasteners holes through the collar 136. It should be appreciated that although not shown in the views illustrated in FIGS. 4 and 5, the pin supports 138, 140 extend on either side of the latch members 112, 114. Each pin support 138, 140 has a flat body with a pin opening respectively for pins 142, 144 and a perpendicular mounting flange 150, 152. The mounting flanges 150, 152 incorporate threaded fastener holes which cooperate with the fasteners 148 to attach the pin supports 142, 144 below and to the collar 136. When disposed below the collar 136, the pin supports 142, 144 form pairs with aligned pin openings through which the rotatable pins 142, 144 are disposed. Each pin 142, 144 is fixed to a linking member 120, 122 and to a latch member 112, 114.

In the preferred embodiment, as shown in FIG. 5, latch members 112, 114 are butterfly wing-shaped plates having a tab 154, wheels 156 which ride in wheel cavities and axles 158 which fit through mounting holes in the tab. Opposing tabs 154, one for each of the latch members 112, 114, are shaped with a convex outer edge with notches 160 between outer edges of the tabs and the tab plates. Cavities for the wheels 156 are within either tab on the latch members 112, 114. The wheels 156 are disposed within either wheel cavity and held in place by either axle 158. The wheels 156 extend beyond the outer edges of the tabs. The latch members 112, 114 are fixed to either pin 142, 144 and rotate about the pin's axis. Latch members 112, 114 are attached to the pins 142, 144 so that the tabs 154 are proximal to the housing of upper latch tube assembly 100 and so that latch members 112, 114 are disposed below the support collar 136.

Referring again to FIGS. 4 and 5, interlock support plate 130 is rectangular having push rod opening 162. Interlock support plate 130 is disposed adjacent to the top of the upper latch tube assembly 100, above collar 136. Collar assembly 118 is disposed about the upper latch tube assembly 100 above openings 132, 134. Collar assembly tab opening 146 and support plate tab opening 162 are aligned vertically. Push rod 126 is slidably disposed through collar assembly tab opening 146 and support plate tab opening 162. Push rod 126 has an upper end and a lower end. A ball knob 164 is disposed at the upper end of push rod 126. Horizontal double clevis 124 is disposed at the lower end of push rod 126. Linking members 120, 122 are flat, rectangular members having a pivot hole at one end and pin mounting holes for receiving the pins 142, 144 at the opposite end. Linking members 120, 122 are rotatably coupled about the pivots on the double clevis 124, one linking member 120, 122 on either side of a double clevis 124. As stated above, linking members 120, 122 are each fixedly attached to a pin 142, 144; this attachment is through the pin mounting holes in the double clevis. Push rod 126 has a flange 166 disposed at locations spaced above collar assembly 118. Spring 128 is a helical coil spring wrapped around push rod 126 and positioned between collar 136 and flange 166, thus biasing push rod 126 upward placing the latch members 112, 114 in a normally latched position.

Thus, the interlock device 110 engages the inner support tube assembly 200 and the upper latch tube assembly 100 in a similar fashion, regardless of whether the inner support tube assembly 200 is in its upper position 202 or its lower position 204. Accordingly, the following description shall address the operation of the interlock device 110 as if the inner support tube assembly 200 is in its upper position 202 and tabs 154 on the latch members 112, 114 pass through the inner support tube assembly lower openings 220, 222. It is understood, however, that the following description is equally applicable to operation of the interlock device 110 with the inner member upper openings 216, 218.

If crane 60 is lifting the inner support tube assembly 200, attached to the bail 212, while tabs 254 of latch members 112, 114 pass through the inner support tube assembly 200 lower openings 220, 222, the inner support tube assembly 200 will slide within the upper latch tube assembly until the lower edge of lower openings 220, 222 of the inner support tube assembly 200 contact the notches 160 on the latch members 112, 114. When the lower edges of the lower openings 220, 222 contact the notches 160, the inner support tube assembly 200 is prevented from sliding within the upper latch tube assembly 100. At this point, raising the crane 60 will lift the entire transfer device 70 as the lifting force is transferred from the inner support tube assembly 200 through the interlock device 110 to the upper latch tube assembly 100.

In operation, as push rod 126 is biased upward by spring 128, push rod 126 lifts the double clevis 124. The double clevis 124, in turn, lifts linking members 120, 122. Linking members 120, 122 act upon the pins 142, 144 which, in turn, acts upon the latch members 112, 114, biasing latch members 112, 114 toward the inner support tube assembly 200. Tabs 154 of the latch members 112, 114 pass through the openings 132, 134 in the upper latch tube assembly 100. When the inner support assembly 200 is in either its upper position 202 or its lower position 204, tabs 154 of latch members 112, 114, also pass through either inner support tube assembly 200 upper openings 216, 218 or lower openings 220, 222. Thus, when the push rods 126 is in its upper position and the openings 132, 134 in the upper latch assembly are aligned with the inner support tube assembly openings 216, 218 or 220, 222, the latch members 112, 114 are in the locked position.

To release the interlock device 110 and allow the inner support tube assembly 200 to slide within the upper latch tube assembly 100, an operator must operate the release mechanism 116 by pressing the ball knob 164 which will counteract the force of the spring 128 acting on the push rod 286 and push the rod 126 into its lower position. When push rod 126 is in its lower position, push rod 126 lowers double clevis 124.

Double clevis 124, in turn, lowers linking members 120, 122. Linking members 120, 122 act upon pins 142, 144 which, in turn, act upon the latch members 112, 114, rotating latch members 112, 114 away from the inner support tube assembly 200 and the upper latch tube assembly 100. Tabs 154 of latch members 112, 114 are then removed from the upper latch tube assembly 100 openings 132, 134 and either inner support tube assembly 200 upper openings 216, 218 or lower openings 220, 222. Thus, when the push rod 126 is in its upper position the latch members 112, 114 are in the unlocked position.

With the latch members 112, 114 in the unlocked position, inner support tube assembly 200 can slide freely within the upper latch tube assembly 100. As the inner support tube assembly 200 slides up or down within the upper latch tube assembly 100, the inner support tube assembly 100 openings either upper or lower 216, 218 or 220, 222, will no longer be aligned with the outer member openings 132, 134. Instead, as the inner support tube assembly 200 is being raised or lowered, the outer surface of the inner support tube assembly 200 is exposed through the openings 132, 134 in the upper latch tube assembly 100. Once the outer surface of the inner support tube assembly 200 is exposed through the upper latch tube assembly 100 openings 132, 134 the operator may release the ball knob 164 and allow latch members 112, 114 to be biased by the spring 128 towards the housing of the upper latch tube assembly 100. Wheels 156 will now contact the outer surface of the inner support tube assembly 200 allowing the inner support tube assembly outer surface to slide between the latch members 112, 114. When the inner support tube assembly 200 reaches either its upper position 202 or its lower position 204, the inner support tube assembly openings, either upper or lower, 216, 218 or 220, 222, will align with the upper latch tube assembly openings 132, 134 and latch members 112, 114 will close, once again locking the inner support tube assembly 200 within the upper latch tube assembly 100.

The upper portion of the inner support tube assembly 200 was described with respect to FIG. 9. FIG. 11 is a cross sectional view of the lower portion of the gripper assembly 400 which is attached through a rod extension, not shown, to the lower portion 224 of the inner support tube assembly 200. The gripper assembly includes two sets of laterally extending fins 404 and 406. Each set of fins includes four separate fins 408 that are equal distantly spaced by 90° around a central hub 410 that has a generally square cross section with the fins extending from the corners of the square central hub 410 as shown in the cross sectional view illustrated in FIG. 11. Each of the fins has an axially extended rounded distal ends that terminates axially at either end in a bullet nose. The intermediate lateral sections of the fins 414 ride in the slots 322 of the alignment cards 306 while the distal ends of the fins 412 ride in the rounded openings 320 within some of the slots 322, the central hub 410 rides in the central opening 324 of the alignment cards 306 all of which assure that the gripper assembly will maintain its orientation as it moves axially within the enclosure assembly 300. The distal ends of the fins 412 ride on the slotted guide bars 309 in between the alignment cards for continued support over the length of the enclosure assembly 300. The gripper 402 at the distal axial end of the gripper assembly 400 is activated by an axially slidable central shaft 416 which is connected to the actuator handle 168 shown in FIG. 4. The actuator handle is maintained in position by a locking pin 170. Movement of the central shaft 416 in a direction toward the gripper 402 spreads the gripper and will lock the gripper within the poison rod assembly hub 46. The design of the gripper increases actuator locking force with any increase in downward load. A spring or springs 418 are captured on either side of a spring spacer 420 and the lower spring is captured between the spacer and the central fin hub 410. The spring or springs 418 are compressed in the gripper assembly and compensate for the approximately sixty percent of the actuator rod weight, and preferably, though not shown in FIG. 10, biases the gripper 402 in a normally locked position.

In operation, the transfer device 70 is seated on a fuel cell 20 as described above. For the purpose of understanding the operation of the transfer device, at this time assume that the inner support tube assembly 200 is in its lower locked position 204. The operator then releases the interlock device 110 and uses the crane 60 to lower the gripper assembly 400 onto the poison rod assembly 40. The gripper 402 will fit into the hub 46. The operator then activates the actuator handle 68 locking the hubs to the gripper and inserts the locking pin 70 to secure the connection. The operator then uses the crane 60 and the ball knob 64 to lift the inner support tube assembly 200 there by raising the gripper 402 and poison rod assembly 40 into the enclosure assembly 300 cavity 308. The interlock device 110 will not latch into the support tube 200, as a cylinder blocks the upper support tube latch opening. Once the inner support tube assembly 200 reaches its upper position 202, the interlock device 110 will engage. After the interlock device 110 has been engaged in the upper position, crane 60 lifts the transfer device 70 off the fuel cell 20. The operator then uses the gantry 64 to reposition the transfer device 70 over a different fuel cell 20. The transfer device 70 is then seated on the second fuel cell 20 as described above. Once the transfer device is seated on the second fuel cell, the operator releases the interlock device 110 by depressing the ball knob 164 and lowers the crane 60 thereby lowering the poison rod assembly 40 into the new fuel cell 20. After the poison rod assembly 40 is inserted into a second fuel cell 20, the operator releases the actuation handle 168 by withdrawing the locking pin 170 and pulling up on the handle to unlatch the poison rod assembly 40 from the gripper assembly 400. The operator then raises the crane 60 to lift the inner support tube assembly 200 until the interlock device 110 engages the lower openings 220, 222. Once the interlock device 110 is engaged in the lower openings 220, 222 in the inner support tube assembly 200, the crane 60 may lift the transfer device 70 off the fuel cell 20. Transporting the transfer device 70 in the telescoped condition with the inner support tube assembly 200 telescoped within the upper latch tube assembly 100 and the enclosure assembly 300 makes movement of the transfer device less awkward and easier to control.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A transfer device for moving a control rod assembly between fuel assemblies employing an overhead crane, the control rod assembly having a plurality of spaced control rods which are supported from an overhead web frame, wherein the control rods are designed to be inserted within a plurality of spaced guide thimble tubes in the fuel assemblies, the transfer device comprising:

an upper latch tube assembly having a longitudinal axis;

an elongated inner member, slidably supported within the upper latch tube assembly and operable to telescope substantially coaxially with the longitudinal axis;

a gripper assembly supported from a one axial end of the elongated inner member, having an actuation shaft reciprocally, slidably supported within the elongated inner member to move substantially along the longitudinal axis a selected distance to actuate a gripper at an axial first end of the gripper assembly opposite a second end of the gripper assembly adjacent the one end of the elongated inner member, another end of the elongated inner member including a bail adapted to attach to the overhead crane;

an interlock assembly attached to the upper latch tube assembly selectively coupling said elongated inner member to the upper latch tube assembly at one or another of two elevations along the longitudinal axis, the one elevation being in a substantially extended position the another elevation being in a substantially retracted position;

an elongated enclosure assembly extending along the longitudinal axis having a length at least substantially equal to the height of the control rod assembly, the enclosure assembly substantially rigidly connected to one end of the upper latch tube assembly and having another end configured to key on the top of the fuel assembly; and a plurality of alignment cards laterally disposed in a spaced tandem array along the length of the enclosure assembly, each of the alignment cards having openings that are aligned and sized to pass a control rod of the control rod assembly so that the control rods are withdrawn into the enclosure assembly in alignment with the guide thimble tubes of the fuel assembly, the alignment cards further including a central opening through which the gripper assembly can pass through and at least some of the alignment cards' central opening sized to pass at least a portion of the elongated inner member.

2. The transfer device of claim 1 wherein the alignment cards prevent rotation of the gripper assembly whether or not the gripper assembly is attached to the control rod assembly.

3. The transfer device of claim 2 wherein the gripper assembly includes a generally rectangular cross-section profile that fits in a corresponding central opening in at least some of the alignment cards.

4. The transfer device of claim wherein the gripper assembly includes at least one laterally extending fin that fits in a corresponding slot in at least some of the alignment cards.

5. The transfer device of claim 4 wherein the gripper assembly includes a plurality of laterally extending fins that are spaced around a circumference of the gripper assembly.

6. The transfer device of claim 5 wherein the laterally extending fins are equidistantly spaced around the circumference of the gripper assembly.

7. The transfer device of claim 4 wherein a distal lateral end of the fin is contoured to have an enlarged cross-section that fits in a corresponding opening in at least some of the alignment cards.

8. The transfer device of claim 7 wherein the contour is round.

9. The transfer device of claim 7 wherein the distal lateral end of the fin has a bullet nose in at least one end in a direction of travel of the gripper assembly.

10. The transfer device of claim 9 wherein the distal lateral end of the fin has a bullet nose in an end on either side of the direction of travel of the gripper assembly.

11. The transfer device of claim 1 wherein the gripper assembly is biased in a latched condition.

12. The transfer device of claim 1 wherein the enclosure assembly includes axially extending guide bars which guide the gripper assembly in between alignment cards and prevent rotation of the gripper assembly whether or not the gripper assembly is attached to the control rod assembly.

13. The transfer device of claim 1 wherein the elongated inner member includes an axially extending centering profile on an outer surface that slides within a centrally located bushing proximate an upper portion of the enclosure assembly.

14. The transfer device of claim 1 wherein the gripper assembly includes a weight compensating spring compressed around the actuation shaft.

15. The transfer device of claim 1 wherein the gripper is designed to increase an actuator locking force with increase in downward load.

16. The transfer device of claim 1 including means for preventing the interlock assembly from coupling the elongated inner member to the upper latch tube assembly at the elevation in the substantially extended position when the actuation shaft on the gripper assembly is in a position to actuate the gripper.

* * * * *